United States Patent [19]
Hull et al.

[11] Patent Number: 5,306,067
[45] Date of Patent: Apr. 26, 1994

[54] REAR DOOR ASSEMBLY FOR AUTOMOBILES

[75] Inventors: Edward I. Hull, West Bloomfield; Michael T. Vecchio, Livonia, both of Mich.

[73] Assignee: Ford Motor Company, Dearborn, Mich.

[21] Appl. No.: 9,195

[22] Filed: Jan. 25, 1993

[51] Int. Cl.⁵ .............................................. B60J 5/04
[52] U.S. Cl. .............................. 296/146.6; 296/146.9; 296/202
[58] Field of Search .......... 296/146 F, 146 R, 146 C, 296/188, 202

[56] References Cited

U.S. PATENT DOCUMENTS 3,776,588 12/1973 Sobajima et al. ............... 296/146 F
3,819,228 6/1974 Cornacchia ..................... 296/146 F Primary Examiner—Robert R. Song
Attorney, Agent, or Firm—Daniel M. Stock; Roger L. May

[57] ABSTRACT

A side door assembly is provided which includes a catch and striker reinforcement mechanism positioned between the free-edge of the door of the adjacent body panel of the vehicle. The striker cooperates with the catch to enhance engagement in response to the imposition of laterally imposed loads through providing a disc-like knob for engagement with catch plate upon deflection of adjacent body panels.

10 Claims, 2 Drawing Sheets

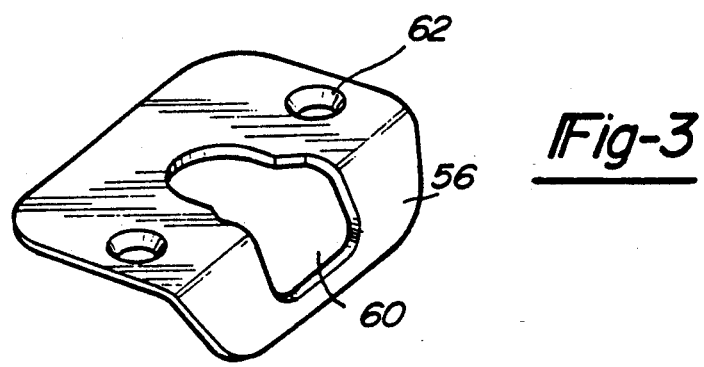
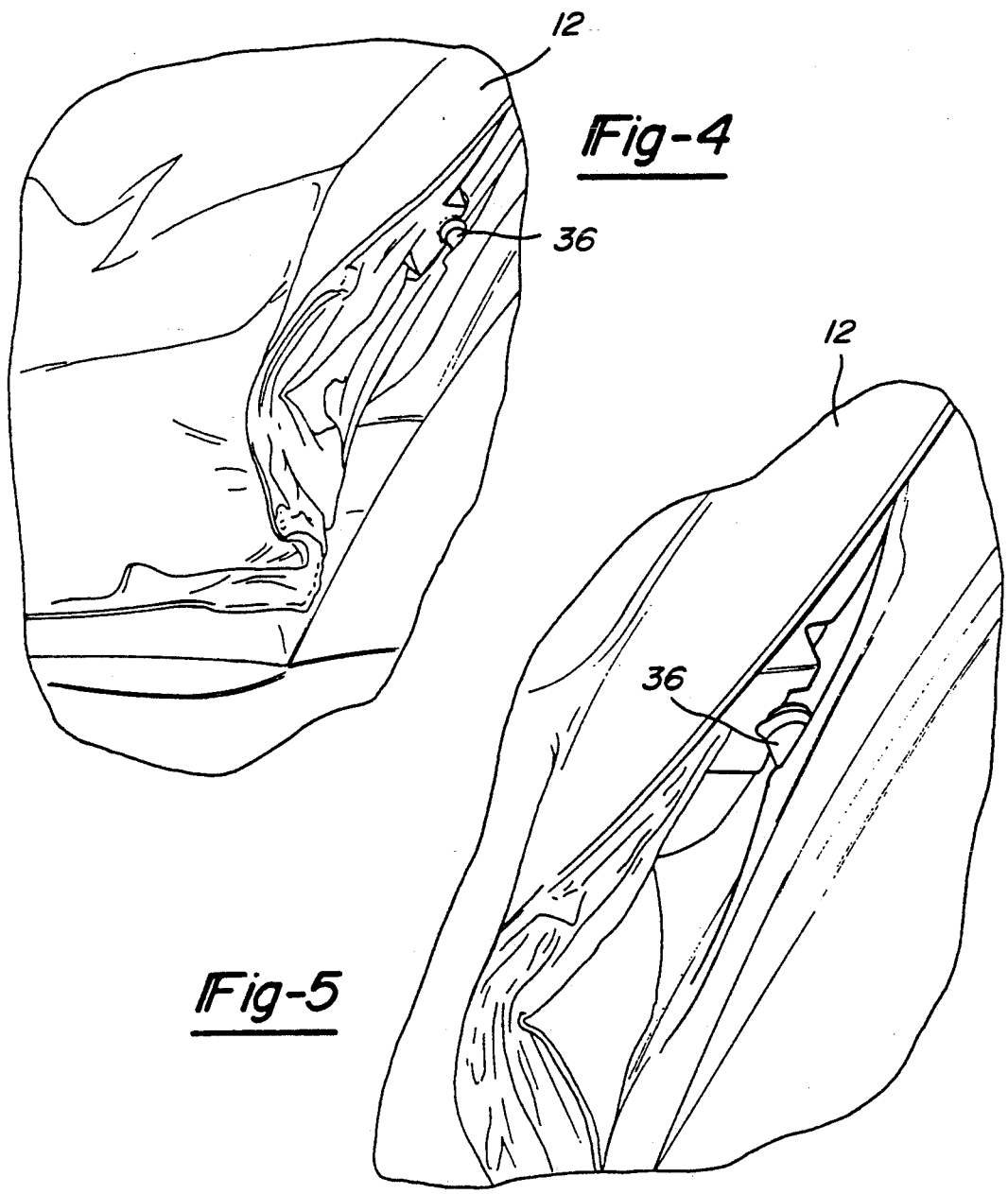

5,306,067

REAR DOOR ASSEMBLY FOR AUTOMOBILES

BACKGROUND OF THE INVENTION

The present invention relates generally to automotive doors and more specifically to the rear side doors of automobiles and auxiliary structure for enhancing the resistance of such doors to the imposition of lateral loads.

Good design practice for automotive bodies requires that attention be given to the resistance of various body side panels to the imposition of lateral loads. Among the more difficult vehicle side panels for which to provide lateral force supporting designs are vehicle doors. U.S. Pat. Nos. 3,819,228 to Cornacchia and 3,776,588 to Sobajima, et al, illustrate vehicle body designs which use special parts and formation, adjacent the upper and lower edges of the door to define two load paths between the door and the peripherally surrounding adjacent body structure of the vehicle. None, however, have adequately provided a means for enhancing the resistance to lateral load by the rear door structure of a conventional automotive vehicle.

To accomplish this desirable goal, it is deemed appropriate to provide a reinforcing mechanism substantially to retain the external shape of the adjacent door and body structures and provide for reinforcing operation that is substantially insensitive to the mechanics of body panel deformation on the side of the vehicle.

SUMMARY OF THE INVENTION

These design goals are met in the side door assembly of the present invention through providing a reinforcing assembly positioned between the trailing edge of the rear door and the quarter panel of the vehicle adjacent to the rear door that is positioned vertically midway between the conventional latch mechanism of the door and the bottom of the door to better distribute loading imposed laterally of the door.

Among the advantages of the door assembly of the present invention are the provision of a reinforcing mechanism that minimally affects the shape of the adjacent body parts, and hence does not require great outlay of cost for incorporation, and the configuration of such reinforcement that is spaced from engagement during normal door operation and is configured to enhance continued engagement during deflection of adjacent body panels upon the imposition of certain laterally imposed external loads to the vehicle.

BRIEF DESCRIPTION OF THE DRAWINGS

These and other advantages and features will be apparent to those skilled in the automotive body art upon reading the following description with reference to the accompanying drawing, in which:

FIG. 3 is a perspective view of the catch plate;

FIGS. 4 and 5 are each perspective views of the door assembly of the present invention illustrating the cooperation of adjacent elements in resisting the imposition of lateral loads.

DESCRIPTION OF THE PREFERRED EMBODIMENT

Figure 1:
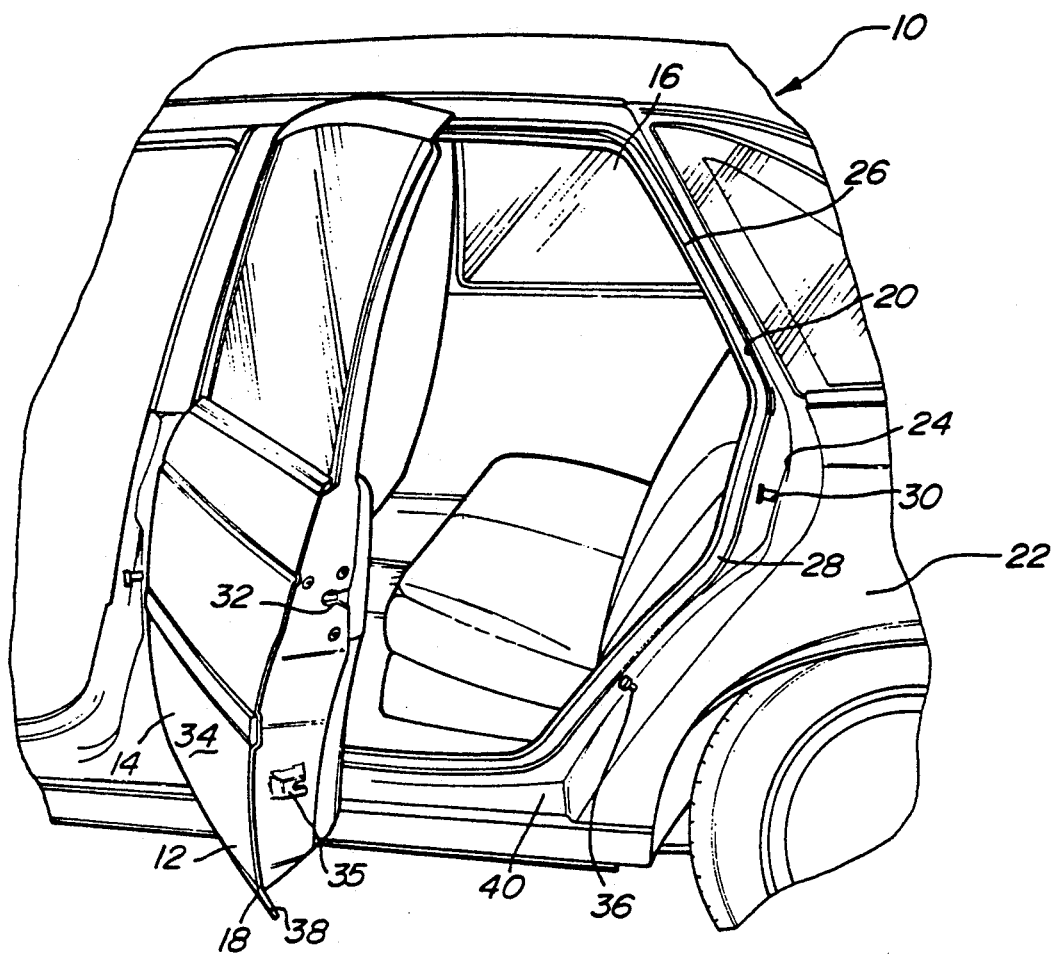
FIG. 1 is a side view of a motor vehicle of the four-door type illustrating its rear side door in the open position.

Turning now to FIG. 1, a vehicle 10 is illustrated as having a rear door 12 mounted for pivotal movement about a substantially vertical axis at a forward edge 14. The door 12 moves between the open position as shown with respect to an aperture 16 and a closed position in which the rear edge 18 of the door 12 is placed in registration with complementary surfaces indicated generally at 20 on vehicle quarter panel 22. Complementary surfaces 20 include a generally vertical latching surface 24 and upper and lower forwardly canted surfaces 26, 28, respectively. The vertical latching surface 24 includes a striker 30 projecting therefrom to engage a latch 32 in a normal selective engagement and disengagement fashion well known in the art. The striker 30 and latch 32 together form a latch assembly positioned substantially midway between the top and bottom of the door 12 around the belt line of the vehicle. In order to enhance the resistance of the door 12 to the imposition of external lateral loads against its outboard face 34, a reinforcement assembly consisting generally of the catch 35 and a striker 36, as shown in FIG. 1, is positioned approximately vertically midway between the latch assembly 32 and the bottom of the door 12.

The door 12 includes lower lip 38 that, in the closed position, is placed in juxtaposition with the sill 40 at the bottom of the aperture 16. Upon imposition of the lateral load against the surface 34, it will be appreciated that the door is supported against inward movement by the latch assembly 30, 32, the reinforcement assembly 35, 36, and the cooperation of lip 38 and sill 40, of course, running substantially along the entire longitudinal extent of the door 12.

Figure 2:
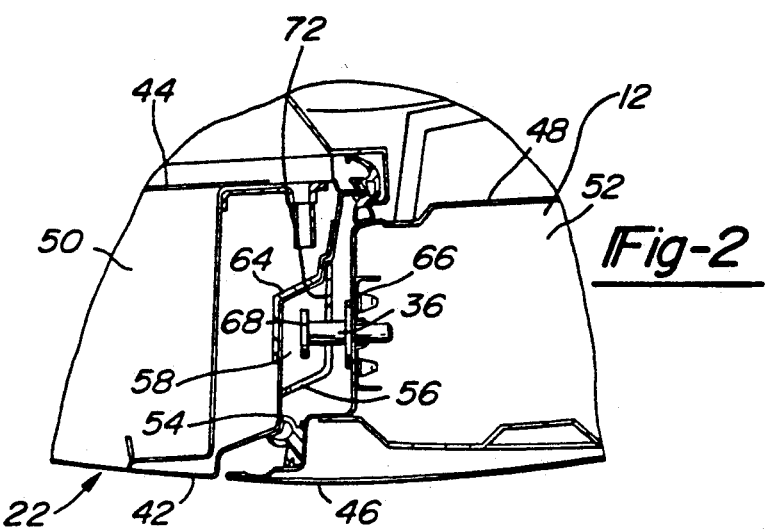
FIG. 2 is a cross-sectional view of the interface between the vehicle door and adjacent body panel in the closed position illustrating reinforcement assembly carried therebetween.

Turning next to FIG. 2, the reinforcement assembly is illustrated in greater detail in a configuration in which the striker 36 is on the door 12 as opposed to the quarter panel 22 as shown in FIG. 1. The quarter panel 22 is illustrated as including an outer panel 42 and an inner panel 44, and the door 12 is illustrated as including an outer panel 46 and inner panel 48, each thus defining a cavity 50, 52, respectively. The edge of the quarter panel includes a generally L-shaped surface indicated at 54. A generally L-shaped catch plate 56 is positioned in facing relationship with respect to the L-shaped surface 54 to define a box section 58 therewith. The catch plate 56 includes a keyhole-shaped slot 60 that pierces both sides of the L-shaped plate and may include fastener apertures, such as indicated at 62, for securement to the quarter panel with suitable fasteners (not shown). A complementary reinforcing plate 64 is positioned within the cavity 50 in registration with the L-shaped surface 54.

Projecting from the cavity 52 of the door 12 is the striker pin 36 projecting in cantilevered fashion. A disc-shaped support 66 is formed on the striker 36 and positioned in abutting relationship with the door 12 to enhance resistance of the striker 36 to bending and a disc-shaped knob 68 is positioned at the free end of the striker 36. From FIG. 2, it can be seen that with the door 12 in the closed position with respect to vehicle body 10, the striker 36 is received in the slot 60 with clearance, thus providing no interference with normal operation of the door. Upon imposition of the outwardly originated laterally imposed load on the surface 34 of the door 12, however, the inner side of the knob 68 will engage the inner side 72 of the plate 56 in hook-like fashion to resist movements of the door 12 with respect to the quarter panel 22 inwardly beyond this closed position. The cooperation between the knob 68 and the catch plate 56 may best be seen in FIG. 5. Flexure of the outer panels 42, 46 inwardly in response to imposition of lateral load will tend to rotate the striker 36 with respect to the catch plate 56, but with engagement maintained, support at the latch 30, 32, the reinforcement assembly 35, 36 and the sill 38, 40 is maintained.

While only one embodiment of the improved door assembly of the present invention has been described, others may be possible without departing from the scope of the appended claims.

What is claimed is:

1. A side door assembly for an automotive vehicle having an aperture formed through the side of the vehicle, the aperture being longitudinally bounded by a forwardly positioned and substantially vertical mounting surface, and a plurality of contiguous rearwardly positioned surfaces including at least a substantially vertical latching surface positioned proximate the vertical mid-point of the vehicle, and a lower canted surface extending forwardly from the vertical latching surface, the side door assembly comprising:
    a door mounted on the vertical mounting surface for pivotal movement between the position closing the aperture and a position opening the aperture;
    a latch mechanism operatively connected between said door and said latching surface when said door is in said closed position; and
    reinforcing means operatively disposed between said door and said canted surface for resisting movement of said door away from said open position and beyond said closed position.

2. A side door assembly as defined in claim 1, wherein said reinforcing means comprises a catch and striker assembly operatively carried between said door and said canted surface.

3. A side door assembly as defined in claim 2, wherein said catch and striker assembly comprises:
    a generally L-shaped catch plate having a slot formed therethrough; and
    a generally cylindrical striker member received in said slot with clearance when said door is in said closed position.

4. A side door assembly as defined in claim 3, wherein said striker is operative to engage said catch plate in bending relationship when said door is moved inwardly beyond said closed position.

5. A side door assembly as defined in claim 3, wherein said striker is mounted in cantilever fashion on one of said doors and said canted surface and includes a disc-like knob portion engageable with said catch plate to resist separation therefrom.

6. A side door assembly as defined in claim 4, wherein said striker i-s mounted in cantilever fashion on one of said doors and said canted surface and includes a disc-like knob portion engageable with said catch plate to resist separation therefrom.

7. A side door assembly as defined in claim 5, wherein the rear edge of said door includes an L-shaped surface, and said catch plate is mounted on said door rear edge to form a box section with said L-shaped surface and said striker is mounted in cantilever fashion on said canted surface vertically mid-way between said latch mechanism and the bottom of said door.

8. A side door assembly as defined in claim 7, wherein the striker extends perpendicularly from said canted surface.

9. A side door assembly as defined in claim 3, wherein the striker extends perpendicularly from said canted surface.

10. A side door assembly as defined in claim 7, and further comprising a generally L-shaped reinforcing plate carried within said door in registration with said L-shaped surface.

* * * * *